US012668536B2

(12) United States Patent
Ciuperca

(10) Patent No.: US 12,668,536 B2
(45) Date of Patent: *Jun. 30, 2026

(54) HYALOCLASTITE, SIDEROMELANE OR TACHYLITE POZZOLAN-BASED GEOPOLYMER CEMENT AND CONCRETE AND METHOD OF MAKING AND USING SAME

(71) Applicant: Greencraft LLC, Norcross, GA (US)

(72) Inventor: Romeo Ilarian Ciuperca, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/325,046

(22) Filed: May 29, 2023

(65) Prior Publication Data

US 2023/0295039 A1 Sep. 21, 2023

Related U.S. Application Data

(63) Continuation of application No. 17/590,432, filed on Feb. 1, 2022, now Pat. No. 11,702,361, which is a continuation of application No. 16/995,369, filed on Aug. 17, 2020, now Pat. No. 11,236,018, which is a continuation of application No. 16/049,399, filed on Jul. 30, 2018, now Pat. No. 10,745,321, which is a continuation of application No. 15/817,469, filed on Nov. 20, 2017, now Pat. No. 10,047,005, which is a continuation-in-part of application No. 15/595,411, filed on May 15, 2017, now Pat. No. 9,822,037, and a continuation-in-part of application No. 15/595,430, filed on May 15, 2017, now Pat. No. 9,828,289.

(51) Int. Cl.

| | |
|---|---|
| *C04B 7/12* | (2006.01) |
| *C04B 7/02* | (2006.01) |
| *C04B 7/51* | (2006.01) |
| *C04B 12/00* | (2006.01) |
| *C04B 12/04* | (2006.01) |
| *C04B 14/04* | (2006.01) |
| *C04B 14/14* | (2006.01) |
| *C04B 18/02* | (2006.01) |
| *C04B 28/02* | (2006.01) |
| *C04B 28/04* | (2006.01) |
| *C04B 28/18* | (2006.01) |
| *C04B 103/00* | (2006.01) |

(52) U.S. Cl.
CPC .................. *C04B 7/12* (2013.01); *C04B 7/02* (2013.01); *C04B 7/51* (2013.01); *C04B 12/005* (2013.01); *C04B 12/04* (2013.01); *C04B 14/04* (2013.01); *C04B 14/14* (2013.01); *C04B 18/02* (2013.01); *C04B 28/02* (2013.01); *C04B 28/04* (2013.01); *C04B 28/18* (2013.01); *C04B 2103/009* (2013.01); *C04B 2201/50* (2013.01)

(58) Field of Classification Search
CPC .... C04B 7/12; C04B 7/02; C04B 7/51; C04B 12/005; C04B 12/04; C04B 14/04; C04B 14/14; C04B 18/02; C04B 28/006; C04B 28/26; C04B 28/02; C04B 28/04; C04B 28/18; C04B 2103/009; C04B 2201/50; Y02P 40/10
See application file for complete search history.

(56) References Cited

U.S. PATENT DOCUMENTS

| | | | |
|---|---|---|---|
| 11,236,018 B2 * | 2/2022 | Ciuperca | ................. C04B 12/04 |
| | | | 106/606 |
| 11,702,361 B2 * | 7/2023 | Ciuperca | .................. C04B 7/51 |
| | | | 106/606 |

FOREIGN PATENT DOCUMENTS

| | | | |
|---|---|---|---|
| EP | 1367032 A1 * | 12/2003 | ............. C04B 11/02 |

* cited by examiner

*Primary Examiner* — Anthony J Green
(74) *Attorney, Agent, or Firm* — Robert E. Richards

(57) ABSTRACT

The invention comprises a cementitious material comprising a natural pozzolan selected from hyaloclastite, sideromelane or tachylite, wherein the natural pozzolan has a volume-based mean particle size of less than or equal to 40 μm. The cementitious material also comprising an aqueous alkaline activating solution suitable for forming a geopolymer. A method making a cementitious material is also disclosed.

20 Claims, No Drawings

HYALOCLASTITE, SIDEROMELANE OR TACHYLITE POZZOLAN-BASED GEOPOLYMER CEMENT AND CONCRETE AND METHOD OF MAKING AND USING SAME

CROSS-REFERENCE TO RELATED APPLICATIONS

This application is a continuation of application Ser. No. 17/590,432 filed Feb. 1, 2022, now U.S. Pat. No. 11,702,361 which is a continuation of application Ser. No. 16/995,369 filed Aug. 17, 2020, now U.S. Pat. No. 11,236,018, which is a continuation-in-part of application Ser. No. 16/049,399 filed Jul. 30, 2018, now U.S. Pat. No. 10,745,321, which is a continuation of application Ser. No. 15/817,469 filed Nov. 20, 2017, now U.S. Pat. No. 10,047,005, which is a continuation-in-part of application Ser. No. 15/595,411 filed May 15, 2017, now U.S. Pat. No. 9,822,037 and a continuation-in-part of application Ser. No. 15/595,430 filed May 15, 2017, now U.S. Pat. No. 9,828,289.

FIELD OF THE INVENTION

The present invention generally relates to a natural pozzolan. More particularly, the present invention relates to a cementitious material containing hyaloclastite, sideromelane or tachylite (also spelled "tachylyte"). The present invention further relates to concrete or mortar containing hyaloclastite, sideromelane or tachylite or a cementitious material that contains hyaloclastite, sideromelane or tachylite. The present invention also relates to a method of making a hyaloclastite-based cementitious material, a sideromelane-based cementitious material or a tachylite-based cementitious material. The present invention further relates to a method a making concrete with a hydraulic cement and a hyaloclastite-based pozzolan, a sideromelane-based pozzolan or a tachylite-based pozzolan. The present invention further relates to a method of making concrete or mortar with portland cement and a hyaloclastite-based pozzolan, a sideromelane-based pozzolan or a tachylite-based pozzolan. The present invention also relates to a method of making concrete comprising a cementitious material based on hyaloclastite, sideromelane or tachylite. In addition, the present invention relates to a method of curing concrete comprising a hyaloclastite-based pozzolan a sideromelane-based pozzolan or a tachylite-based pozzolan or a hyaloclastite-based cementitious material, a sideromelane-based cementitious material or a tachylite-based cementitious material.

BACKGROUND OF THE INVENTION

Concrete dates back at least to Roman times. The invention of concrete allowed the Romans to construct building designs, such as arches, vaults and domes, that would not have been possible without the use of concrete. Roman concrete, or opus caementicium, was made from a hydraulic mortar and aggregate or pumice. The hydraulic mortar was made from either quicklime, gypsum or pozzolana. Quick lime, also known as burnt lime, is calcium oxide; gypsum is calcium sulfate dihydrate and pozzolana is a fine, sandy volcanic ash (with properties that were first discovered in Pozzuoli, Italy). The concrete made with volcanic ash as the pozzolanic agent was slow to set and gain strength. Most likely the concrete was build up in multiple layers on forms that had to stay in place for a very long time. Although the concrete was slow to set and gain strength, over long periods of time it achieved great strength and was extremely durable. There are still Roman concrete structures standing today as a testimony to the quality of the concrete produced over 2000 years ago.

Modern concrete is composed of one or more hydraulic cements, coarse aggregates, and fine aggregates. Optionally, modern concrete can include other cementitious materials, inert fillers, property modifying admixtures and coloring agents. The hydraulic cement is typically portland cement. Other cementitious materials include fly ash, slag cement and other known natural pozzolanic materials. The term "pozzolan" is defined in ACI 116R as, " . . . a siliceous or siliceous and aluminous material, which in itself possesses little or no cementitious value but will, in finely divided form and in the presence of moisture, chemically react with calcium hydroxide at ordinary temperatures to form compounds possessing cementitious properties."

Portland cement is the most commonly used hydraulic cement in use around the world today. Portland cement is typically made from limestone. Concrete or mortar made with portland cement sets relatively quickly and gains relatively high compressive strength in a relatively short time. Although significant improvements have been made to the process and efficiency of portland cement manufacturing, it is still a relatively expensive and highly polluting industrial process.

Fly ash is a by-product of the combustion of pulverized coal in electric power generation plants. When the pulverized coal is ignited in a combustion chamber, the carbon and volatile materials are burned off. When mixed with lime and water, fly ash forms a compound similar to portland cement. Two classifications of fly ash are produced according to the type of coal from which the fly ash is derived. Class F fly ash is normally produced from burning anthracite or bituminous coal that meets applicable requirements. This class of fly ash has pozzolanic properties and will have minimum amounts of silica dioxide, aluminum oxide and iron oxide of 70%. Class F fly ash is generally used in hydraulic cement at dosage rates of 15% to 30% by weight, with the balance being portland cement. Class C fly ash is normally produced from lignite or subbituminous coal that meets applicable requirements. This class of fly ash, in addition to pozzolanic properties, also has some cementitious properties. Class C fly ash is used in hydraulic cement at dosage rates of 15% to 40% by weight, with the balance being portland cement.

Recently, the U.S. concrete industry has used an average of million tons of fly ash at an average portland cement replacement ratio of approximately 16% by weight. Since fly ash is a by-product from the electric power generating industry, the variable properties of fly ash have always been a major concern to the end users in the concrete industry. Traditionally, wet scrubbers and flue gas desulfurization ("FGD") systems have been used to control power plant $SO_2$ and $SO_3$ emissions. The residue from such systems consists of a mixture of calcium sulfite, sulphate, and fly ash in water. In using sodium-based reagents to reduce harmful emissions from the flue gas, sodium sulfite and sulfate are formed. These solid reaction products are incorporated in a particle stream and collected with the fly ash in particulate control devices. There is the potential for the sodium-based reagent to react with other components of the gas phases and with ash particulates in the flue gas and in the particulate control device. All of the products of these reactions have the potential to impact the resulting fly ash. Anecdotal evidence has shown that the fly ash that contains sodium-based components has unpredictable and deleterious effect in concrete. Consequently, the concrete industry is at great risk of using a product that is unpredictable in its performance. Coupled with the closure of many coal-fired power plants, resulting in less availability of fly ash, the concrete industry is facing a dramatic shortage of a familiar pozzolan.

Known natural pozzolans can be used in concrete to replace the growing shortage of fly ash. However, known natural pozzolan deposits are limited and generally are far from construction markets. Natural pozzolans can be raw or processed. ASTM C-618 defined Class N natural pozzolans as, "Raw or calcined natural pozzolans that comply with the applicable requirements for the class as given herein, such as some diatomaceous earth; opaline chert and shales; tuffs and volcanic ashes or pumicites, any of which may or may not be processed by calcination; and various materials requiring calcination to induce satisfactory properties, such as some clays and shales."

Other known natural pozzolans include Santorin earth, Pozzolana, Trachyte, Rhenish trass, Gaize, volcanic tuffs, pumicites, diatomaceous earth, and opaline shales, rice husk ash and metakaolin. Santorin earth is produced from a natural deposit of volcanic ash of dacitic composition on the island of Thera in the Agean Sea, also known as Santorin, which was formed about 1600-1500 B.C. after a tremendous explosive volcanic eruption (Marinatos 1972). Pozzolana is produced from a deposit of pumice ash or tuff comprised of trachyte found near Naples and Segni in Italy. Pozzolana is a product of an explosive volcanic eruption in 79 A.D. at Mount Vesuvius, which engulfed Herculaneum, Pompeii, and other towns along the bay of Naples. The deposit near Pozzuoli is the source of the term "pozzolan" given to all materials having similar properties. Similar tuffs of lower silica content have been used for centuries and are found in the vicinity of Rome. In the United States, volcanic tuffs and pumicites, diatomaceous earth, and opaline shales are found principally in Oklahoma, Nevada, Arizona, and California. Rice husk ash ("RHA") is produced from rice husks, which are the shells produced during the dehusking of rice. Rice husks are approximately 50% cellulose, 30% lignin, and 20% silica. Metakaolin ($Al_2O_3$:$2SiO_2$) is a natural pozzolan produced by heating kaolin-containing clays over a temperature range of about 600 to 900° C. (1100 to 1650° F.) above which it recrystallizes, rendering it mullite ($Al_6Si_2O_{13}$) or spinel ($MgAl_2O_4$) and amorphous silica (Murat, Ambroise, and Pera 1985). The reactivity of metakaolin is dependent upon the amount of kaolinite contained in the original clay material. The use of metakaolin as a pozzolanic mineral admixture has been known for many years, but has grown rapidly since approximately 1985.

Natural pozzolans were investigated in this country by Bates, Phillips and Wig as early as 1908 (Bates, Phillips and Wig 1912) and later by Price (1975), Meissner (1950), Mielenz, Witte, and Glantz (1950), Davis (1950), and others. They showed that concretes containing pozzolanic materials exhibited certain desirable properties such as lower cost, lower temperature rise, and improved workability. According to Price (1975), an example of the first large-scale use of portland-pozzolan cement, composed of equal parts of Portland cement and a rhyolitic pumicite, is the Los Angeles aqueduct in 1910-1912. Natural pozzolans by their very definition have high silica or alumina and silica content either in a raw or calcined form.

Generally fly ash has the advantage that it can reduce water demand of the cementitious matrix. This reduces plastic shrinkage and allows for better workability. Generally, known natural pozzolans and silica fume increase water demand in the cementitious matrix; in some cases as high as 110%-115% that of portland cement. Greater water demand creates undesirable concrete properties such as lower strength development and greater plastic shrinkage. It is desired that pozzolans have a water demand that is lower than or equal to portland cement. However, this is an extremely rare occurrence for known natural pozzolans.

The alkali-silica reaction ("ASR"), more commonly known as "concrete cancer", is a reaction that occurs over time in concrete between the highly alkaline cement paste and the reactive non-crystalline (amorphous) silica found in many common aggregates, provided there is sufficient moisture present. This reaction causes the expansion of the altered aggregate by the formation of a soluble and viscous gel of sodium silicate ($Na_2SiO_3$·n $H_2O$, also noted $Na_2H_2SiO_4$·n $H_2O$, or N—S—H (sodium silicate hydrate), depending on the adopted convention). This hygroscopic gel swells and increases in volume when absorbing water. The swelling gel exerts an expansive pressure inside the siliceous aggregate, causing spalling and loss of strength of the concrete, finally leading to its failure. ASR can cause serious cracking in concrete, resulting in critical structural problems that can even force the demolition of a particular structure.

Therefore, it would be desirable to have a natural pozzolan that does not need to be calcined to render it active. It would also be desirable to have a natural pozzolan that has a water demand less than or equal to portland cement. It would also be desirable to have a natural pozzolan with properties as good as or better than fly ash. It would also be desirable to have a natural pozzolan that reduces ASR in concrete. It would be desirable to have a natural pozzolan that has ASR mitigation properties better than or equal to portland cement. It would also be desirable to have a natural pozzolan with similar specific gravity as portland cement that can replace portland cement on a one-to-one basis. It would also be desirable to have a natural pozzolan that produce a concrete with relatively rapid setting and strength gaining properties. It would also be desirable to have a natural pozzolan that when combined with portland cement produces a concrete with an ultimate compressive strength greater than or equal to straight portland cement-based concrete.

SUMMARY OF THE INVENTION

The present invention satisfies the foregoing needs by providing a natural pozzolan that has improved properties and lower water demand than known natural pozzolans.

In one disclosed embodiment, the present invention comprises a cementitious material. The cementitious material comprises a natural pozzolan selected from hyaloclastite, sideromelane or tachylite, wherein the natural pozzolan has a volume-based mean particle size of less than or equal to 40 μm. The cementitious material also comprising an aqueous alkaline activating solution suitable for forming a geopolymer.

In another disclosed embodiment, the present invention comprises a cementitious-based material. The cementitious-based material comprises aggregate, hyaloclastite having a volume-based mean particle size of less than or equal to approximately 40 μm and an alkaline activating solution comprising sodium hydroxide or potassium hydroxide and water.

In yet another disclosed embodiment, the present invention comprises a method of making a cementitious material. The method comprises combining a natural pozzolan selected from hyaloclastite, sideromelane, tachylite or combinations or mixtures thereof, wherein the natural pozzolan has a volume-based mean particle size of less than or equal to approximately 40 μm and an aqueous alkaline activating solution suitable for forming a geopolymer.

In another disclosed embodiment, the present invention comprises a method. The method comprises placing in a form or a mold a cementitious composition comprising aggregate and a geopolymer, wherein the geopolymer comprises a natural pozzolan selected from hyaloclastite, sideromelane or tachylite, wherein the natural pozzolan has a volume-based mean particle size of less than or equal to 40 μm and an aqueous alkaline activating solution suitable for forming a geopolymer.

In another disclosed embodiment, the present invention comprises a cementitious-based material. The cementitious-based material comprises a natural pozzolan selected from hyaloclastite, sideromelane, tachylite or combinations or mixtures thereof, wherein the natural pozzolan has a volume-based mean particle size of less than or equal to approximately 40 μm, quicklime and water.

In another disclosed embodiment, the present invention comprises a cementitious-based material. The cementitious-based material comprises a composition formed from a molten mineral that has been quenched by water to form a fragmented, solid mineral, wherein the mineral comprises approximately 43% to approximately 63% by weight $SiO_2$, wherein the mineral has a volume-based mean particle size of less than or equal to approximately 40 μm, a quicklime and water.

In another disclosed embodiment, the present invention comprises a cementitious-based material. The cementitious-based material comprises a composition formed from a molten mineral that has been quenched by water to form a fragmented, solid mineral, wherein the mineral comprises approximately 43% to approximately 63% by weight $SiO_2$ and wherein the mineral has a volume-based mean particle size of less than or equal to approximately 40 μm, hydrated lime and water.

Accordingly, it is an object of the present invention to provide an improved concrete or mortar.

Another object of the present invention is to provide an improved cementitious material.

A further object of the present invention is to provide an improved geopolymer.

Yet another object of the present invention is to provide an improved geopolymer cement.

Another object of the present invention is to provide an improved geopolymer cement concrete.

Another object of the present invention is to provide an improved natural pozzolan.

Another object of the present invention is to provide a natural pozzolan selected from hyaloclastite, sideromelane, tachylite or combinations or mixtures thereof.

These and other objects, features and advantages of the present invention will become apparent after a review of the following detailed description of the disclosed embodiments and the appended claims.

DETAILED DESCRIPTION OF THE DISCLOSED EMBODIMENTS

Hyaloclastite is a tuff-like breccia typically rich in black volcanic glass, formed during volcanic eruptions under water, under ice or where subaerial flows reach the sea or other bodies of water. It has the appearance of angular fragments sized from approximately a millimeter to a few centimeters. Larger fragments can be found up to the size of pillow lava as well. Several minerals are found in hyaloclastite masses including, but not limited to, sideromelane, tachylite, palagonite, olivine, pyroxene, magnetite, quartz, hornblende, biotite, hypersthene, feldspathoids, plagioclase, calcite and others. Fragmentation can occur by both an explosive eruption process or by an essentially nonexplosive process associated with the spalling of pillow basalt rinds by thermal shock or chill shattering of molten lava. The water-quenched basalt glass is called sideromelane, a pure variety of glass that is transparent, and lacks the very small iron-oxide crystals found in the more common opaque variety of basalt glass called tachylite. In hyaloclastite, these glassy fragments are typically surrounded by a matrix of yellow-to-brown palagonite, a wax-like substance that forms from the hydration and alteration of the sideromelane and other minerals. Depending on the type of lava, the rate of cooling and the amount of lava fragmentation, the particle of the volcanic glass (sideromelane) can be mixed with other volcanic rocks or crystalline minerals, such as olivine, pyroxene, magnetite, quartz, plagioclase, calcite and others.

Hyaloclastite is usually found within or adjacent subglacial volcanoes, such as tuyas, which is a type of distinctive, flat-topped, steep-sided volcano formed when lava erupts under or through a thick glacier or ice sheet. Hyaloclastite ridges are also called tindars and subglacial mounds are called tuyas or mobergs. They have been formed by subglacial volcanic eruptions during the last glacial period. A subglacial mound is a type of subglacial volcano. This type of volcano forms when lava erupts beneath a thick glacier or ice sheet. The magma forming these volcanoes was not hot enough to melt a vertical pipe through the overlying glacial ice, instead forming hyaloclastite and pillow lava deep beneath the glacial ice field. Once the glacier retreated, the subglacial volcano was revealed, with a unique shape as a result of its confinement within the glacial ice. Subglacial volcanoes are somewhat rare worldwide, being confined to regions that were formerly covered by continental ice sheets and also had active volcanism during the same period. Currently, volcanic eruptions under existing glaciers may create hyaloclastite as well. Hyaloclastite tuff-like breccia is a pyroclastic rock comprised of glassy juvenile clasts contained in a fine-grained matrix dominated by glassy shards. Hyaloclastite breccias are typically products of phreatomagmatic eruptions in particular associated with the eruption of magmas into bodies of water and form by fragmentation of chilled magma. They are often formed from basaltic magmas and are associated with pillow lavas and sheet flows. In addition, any other type of lava, such as intermediate, andesitic, dacitic and rhyolitic, can form hyaloclastite under similar rapid cooling or quenching conditions.

In lava deltas, hyaloclastite forms the main constituent of foresets formed ahead of the expanding delta. The foresets fill in the seabed topography, eventually building up to sea level, allowing the subaerial flow to move forward until it reaches the sea again.

At mid-ocean ridges, tectonic plates diverge, creating fissures on the ocean floor. Along these fissures underwater volcanoes erupt forming sea mounds that in some places can reach the surface of the water. As the lava erupts underwater, it can be rapidly quenched thereby creating hyaloclastite. This is an active process especially at hot spots around the world. These hot spots are an important cause of island formation. These islands are a prime sources of hyaloclastite formation.

Volcanic lava eruptions in Hawaii that spill in the ocean are also rapidly quenched and fragmented thus producing hyaloclastite. The rapid cooling and quenching prevents or reduces lava crystallization thus hyaloclastite may have a significant amorphous make up.

Basalt is an aphanitic (fine-grained) igneous rock with generally 43% to 53% silica ($SiO_2$) containing essentially calcic plagioclase feldspar and pyroxene (usually Augite), with or without olivine. Intermediate basalt has generally between 53% to 57% silica ($SiO_2$) content. Basalts can also contain quartz, hornblende, biotite, hypersthene (an orthopyroxene) and feldspathoids. Basalts are often porphyritic and can contain mantle xenoliths. Basalt is distinguished from pyroxene andesite by its more calcic plagioclase. There are two main chemical subtypes of basalt: tholeiites which are silica saturated to oversaturated and alkali basalts that are silica under saturated. Tholeiitic basalt dominates the upper layers of oceanic crust and oceanic islands, alkali basalts are common on oceanic islands and in continental magmatism. Basalts can occur as both shallow hypabyssal intrusions or as lava flows. The average density basalt is approximately 3.0 $gm/cm^3$.

Andesite is an abundant igneous (volcanic) rock of intermediate composition, with aphanitic to porphyritic texture. In a general sense, it is an intermediate type between basalt and dacite, and ranges from 57% to 63% silicon dioxide ($SiO_2$). The mineral assemblage is typically dominated by plagioclase plus pyroxene or hornblende. Magnetite, zircon, apatite, ilmenite, biotite, and garnet are common accessory minerals. Alkali feldspar may be present in minor amounts.

Dacite is an igneous, volcanic rock with an aphanitic to porphyritic texture and is intermediate in composition between andesite and rhyolite and ranges from 63% to 69% silicon dioxide ($SiO_2$). It consists mostly of plagioclase feldspar with biotite, hornblende, and pyroxene (augite and/or enstatite). It has quartz as rounded, corroded phenocrysts, or as an element of the ground-mass. The plagioclase ranges from oligoclase to andesine and labradorite. Sanidine occurs, although in small proportions, in some dacites, and when abundant gives rise to rocks that form transitions to the rhyolites. The groundmass of these rocks is composed of plagioclase and quartz.

Rhyolite is an igneous (volcanic) rock of felsic (silica-rich) composition, typically greater than 69% $SiO_2$. It may have a texture from glassy to aphanitic to porphyritic. The mineral assemblage is usually quartz, sanidine and plagioclase. Biotite and hornblende are common accessory minerals.

Hyaloclastite can be classified based on the amount of silica content as: basaltic (less than 53% by weight $SiO_2$), intermediate (approx. 53-57% by weight $SiO_2$), or silicic such as andesitic (approximately 57-63% by weight $SiO_2$), dacitic (approximately by weight 63-69% by weight $SiO_2$), or rhyolitic (greater than 69% by weight $SiO_2$). Basaltic hyaloclastite can be classified based on alkalinity level as tholeiitic, intermediate and alkaline.

As used herein, the term "hyaloclastite" shall mean hyaloclastite from any and all sources; i.e., all hyaloclastites irrespective of the mineral source from which it is derived.

Hyaloclastite, sideromelane or tachylite deposits can be found in many places throughout the world including, but not limited to, Alaska, New Mexico, Michigan, British Columbia, Hawaii, Iceland, throughout the world oceans on seamounts and on oceanic islands formed at magmatic arcs and tectonic plate rifts by volcanic activity, such as the mid-Atlantic ridge, and others.

In one disclosed embodiment, the present invention comprises hyaloclastite in powder form. The particle size of the hyaloclastite powder is sufficiently small such that the hyaloclastite powder has pozzolanic properties. The hyaloclastite powder preferably has a volume-based mean particle size of less than or equal to approximately 40 μm, more preferably less than or equal to 20 μm, most preferably less than or equal to 15 μm, especially less than or equal to 10 μm, more especially less than or equal to 5 μm. The smaller the particle size for the hyaloclastite powder the better. However, there are economic limits for grinding rock to small particle sizes. Those limits are well known by those skilled in the art. The hyaloclastite powder preferably has a Blaine value of approximately 1,500 to approximately 10,000, more preferably approximately 3,500 to approximately 10,000, most preferably approximately 4,500 to approximately 10,000, especially approximately 6,000 to approximately 10,000. The hyaloclastite powder preferably has a Blaine value of greater than or equal to approximately 10,000. The foregoing ranges include all of the intermediate values.

In another disclosed embodiment, the present invention comprises sideromelane in powder form. The particle size of the sideromelane powder is sufficiently small such that the sideromelane powder has pozzolanic properties. The sideromelane powder preferably has a volume-based mean particle size of less than or equal to approximately 40 μm, more preferably less than or equal to 20 μm, most preferably less than or equal to 15 μm, especially less than or equal to 10 μm, more especially less than or equal to 5 μm. The smaller the particle size for the sideromelane powder the better. However, there are economic limits for grinding rock to small particle sizes. Those limits are well known by those skilled in the art. The sideromelane powder preferably has a Blaine value of approximately 1,500 to approximately 10,000, more preferably approximately 3,500 to approximately 10,000, most preferably approximately 4,500 to approximately 10,000, especially approximately 6,000 to approximately 10,000. The sideromelane powder preferably has a Blaine value of greater than or equal to approximately 10,000. The foregoing ranges include all of the intermediate values.

In another disclosed embodiment, the present invention comprises tachylite in powder form. The particle size of the tachylite powder is sufficiently small such that the tachylite powder has pozzolanic properties. The tachylite powder preferably has a volume-based mean particle size of less than or equal to approximately 40 μm, more preferably less than or equal to 20 μm, most preferably less than or equal to 15 μm, especially less than or equal to 10 μm, more especially less than or equal to 5 μm. The smaller the particle size for the tachylite powder the better. However, there are economic limits for grinding rock to small particle sizes. Those limits are well known by those skilled in the art. The tachylite powder preferably has a Blaine value of approximately 1,500 to approximately 10,000, more preferably approximately 3,500 to approximately 10,000, most preferably approximately 4,500 to approximately 10,000, especially approximately 6,000 to approximately 10,000. The tachylite powder preferably has a Blaine value of greater than or equal to approximately 10,000. The foregoing ranges include all of the intermediate values.

To achieve the desired particles size, the hyaloclastite, sideromelane or tachylite rock can be ground using conventional rock grinding means including, but not limited to, a ball mill, a roll mill or a plate mill. A particle size classifier can be used in conjunction with the mill to achieve the desired particle size. Equipment for grinding and classifying hyaloclastite to the desired particle size is commercially available from, for example, F. L. Smidth, Bethlehem, PA; Metso, Helsinki, Finland and others. The ground hyaloclastite, sideromelane or tachylite powder is then preferably classified by screening the powder with a 325-mesh screen or sieve. Preferably approximately 80% by volume of the hyaloclastite, sideromelane or tachylite powder passes through a 325-mesh screen, more preferably approximately 85% by volume of the hyaloclastite, sideromelane or tachylite powder passes through a 325-mesh screen, most preferably approximately 90% by volume of the hyaloclastite, sideromelane or tachylite powder passes through a 325-mesh screen, especially approximately 95% by volume of the hyaloclastite, sideromelane or tachylite powder passes through a 325-mesh screen and more especially approximately 100% by volume of the hyaloclastite, sideromelane or tachylite powder passes through a 325-mesh screen. Preferably approximately 80% to approximately 100% by volume of the hyaloclastite, sideromelane or tachylite powder passes through a 325-mesh screen, more preferably approximately 90% to approximately 100% by volume of the hyaloclastite, sideromelane or tachylite powder passes through a 325-mesh screen, most preferably approximately 95% to approximately 100% by volume of the hyaloclastite, sideromelane or tachylite powder passes through a 325-mesh screen, especially approximately 100% by volume of the hyaloclastite, sideromelane or tachylite powder passes through a 325-mesh screen. The foregoing ranges include all of the intermediate values. Preferably a maximum of 34% by volume of the hyaloclastite, sideromelane or tachylite powder is retained on the 325-mesh screen, more preferably a maximum of approximately 20% by volume of the hyaloclastite, sideromelane or tachylite powder is retained on the 325-mesh screen, most preferably a maximum of approximately 10% by volume of the hyaloclastite, sideromelane or tachylite powder is retained on the 325-mesh screen, especially a maximum of approximately 5% by volume of the hyaloclastite, sideromelane or tachylite powder is retained on the 325-mesh screen, more especially approximately 0% by volume of the hyaloclastite, sideromelane or tachylite powder is retained on the 325-mesh screen. The foregoing percentages include all of the intermediate values.

In another disclosed embodiment, the hyaloclastite, sideromelane or tachylite rock can be interground with hydraulic cement clinker. For example, hyaloclastite, sideromelane or tachylite rock can be interground with portland cement clinker or slag cement clinker. That is hyaloclastite, sideromelane or tachylite rock and portland cement clinker can be combined and ground at the same time with the same equipment.

In one disclosed embodiment of the present invention, the hyaloclastite, sideromelane or tachylite preferably has a chemical composition of approximately 43% to approximately 57% by weight $SiO_2$, approximately 5% to approximately 20% by weight $Al_2O_3$, approximately 8% to approximately 15% by weight $Fe_2O_3$, approximately 5% to approximately 15% by weight CaO, approximately 5% to approximately 15% by weight MgO, less than or equal to approximately 3% by weight $Na_2O$. In addition to the foregoing, other compounds can be present in small amounts, such as $K_2O$, $TiO_2$, $P_2O_5$, MnO, various metals, rare earth trace elements and other unidentified elements. When combined, these other compounds represent less than 10% by weight of the total chemical composition of the hyaloclastite mineral.

In another disclosed embodiment, the hyaloclastite, sideromelane or tachylite in accordance with the present invention preferably has a density or specific gravity of approximately 2.8 to approximately 3.1.

Hyaloclastite, sideromelane or tachylite in accordance with the present invention can be in crystalline or amorphous (glassy) form and is usually found as a combination of both in varying proportions. Preferably, the hyaloclastite, sideromelane or tachylite in accordance with the present invention comprises approximately 0% to 99% by weight amorphous form, more preferably approximately 10% to approximately 80% by weight amorphous form, most preferably 20% to approximately 60% by weight amorphous form, especially approximately 30% to approximately 50% by weight amorphous form. The crystalline portion of hyaloclastite, sideromelane or tachylite preferably comprises approximately 3% to approximately 20% by weight olivine, approximately 5% to approximately 40% by weight clinopyroxene, approximately 5% to approximately 60% by weight plagioclase, and approximately 0% to approximately 10% (or less than 10%) by weight other minerals including, but not limited to, magnetite, UlvoSpinel, quartz, feldspar, pyrite, illite, hematite, chlorite, calcite, hornblende, biotite, hypersthene (an orthopyroxene), feldspathoids sulfides, metals, rare earth minerals, other unidentified minerals and combinations thereof. The foregoing ranges include all of the intermediate values.

Hyaloclastite, sideromelane, tachylite or combinations or mixtures thereof in accordance with the present invention can be used as a supplementary cementitious material in concrete or mortar mixes. In addition, hyaloclastite, sideromelane or tachylite in accordance with the present invention when mixed with cement may improve the cement nucleation process thereby improving the cement hydration process. Hyaloclastite, sideromelane or tachylite in finer particles generally yields shorter set times and accelerates hydration in blended cements. Finer particle size hyaloclastite, sideromelane or tachylite increases the rate of hydration heat development and early-age compressive strength in portland cement. This acceleration may be attributable to the hyaloclastite sideromelane or tachylite particle size (nucleation sites), its crystalline make-up and/or chemical composition. Hyaloclastite, sideromelane or tachylite in accordance with the present invention can be used in combination with any hydraulic cement, such as portland cement. Other hydraulic cements include, but are not limited to, blast granulated slag cement, calcium aluminate cement, belite cement (dicalcium silicate), phosphate cements and others. Also, hyaloclastite, sideromelane or tachylite in accordance with the present invention by itself can be blended with lime to form a cementitious material. In one disclosed embodiment, blended cementitious material for cement or mortar preferably comprises approximately 10% to approximately 90% by weight hydraulic cement and approximately 10% to approximately 90% by weight hyaloclastite, sideromelane, tachylite or mixtures thereof in accordance with the present invention, more preferably approximately 20% to approximately 80% by weight hydraulic cement and approximately 20% to approximately 80% by weight hyaloclastite, sideromelane, tachylite or mixtures thereof in accordance with the present invention, most preferably approximately 30% to approximately 70% by weight hydraulic cement and approximately 30% to approximately 70% by weight hyaloclastite, sideromelane, tachylite or mixtures thereof in accordance with the present invention, especially approximately 40% to approximately 60% by weight hydraulic cement and approximately 40% to approximately 60% by weight hyaloclastite, sideromelane, tachylite or mixtures thereof in accordance with the present invention, more especially approximately 50% by weight hydraulic cement and approximately 50% by weight hyaloclastite, sideromelane, tachylite or mixtures thereof in accordance with the present invention, and most especially approximately 70% by weight hydraulic cement and approximately 30% by weight hyaloclastite, sideromelane, tachylite or mixtures thereof in accordance with the present invention. In another disclosed embodiment of the present invention, cementitious material for concrete or mortar preferably comprises approximately 50% to approximately 90% by weight hydraulic cement and approximately 10% to approximately 50% by weight hyaloclastite, sideromelane, tachylite or mixtures thereof in accordance with the present invention. The foregoing ranges include all of the intermediate values.

The present invention can be used with conventional concrete mixes. Specifically, a concrete mix in accordance with the present invention comprises cementitious material, aggregate and water sufficient to hydrate the cementitious material. The cementitious material comprises a hydraulic cement and hyaloclastite, sideromelane, tachylite or mixtures thereof in accordance with the present invention. The amount of cementitious material used relative to the total weight of the concrete varies depending on the application and/or the strength of the concrete desired. Generally speaking, however, the cementitious material comprises approximately 6% to approximately 30% by weight of the total weight of the concrete, exclusive of the water, or 200 lbs/yd$^3$ (91 kg/m$^3$) of cement to 1,200 lbs/yd$^3$ (710 kg/m$^3$) of cement. In ultra high performance concrete, the cementitious material may exceed 25%-30% by weight of the total weight of the concrete. The water-to-cement ratio by weight is usually approximately 0.25 to approximately 0.7. Relatively low water-to-cement materials ratios by weight lead to higher strength but lower workability, while relatively high water-to-cement materials ratios by weight lead to lower strength, but better workability. For high performance concrete and ultra high performance concrete, lower water-to-cement ratios are used, such as approximately 0.20 to approximately 0.25. Aggregate usually comprises 70% to 80% by volume of the concrete. In ultra high performance concrete, the aggregate can be less than 70% of the concrete by volume. However, the relative amounts of cementitious material to aggregate to water are not a critical feature of the present invention; conventional amounts can be used. Nevertheless, sufficient cementitious material should be used to produce concrete with an ultimate compressive strength of at least 1,000 psi, preferably at least 2,000 psi, more preferably at least 3,000 psi, most preferably at least 4,000 psi, especially up to about 10,000 psi or more. In particular, ultra high performance concrete, concrete panels or concrete elements with compressive strengths of over 20,000 psi can be cast and cured using the present invention.

The aggregate used in the concrete in accordance with the present invention is not critical and can be any aggregate typically used in concrete. The aggregate that is used in the concrete depends on the application and/or the strength of the concrete desired. Such aggregate includes, but is not limited to, fine aggregate, medium aggregate, coarse aggregate, sand, gravel, crushed stone, lightweight aggregate, recycled aggregate, such as from construction, demolition and excavation waste, and mixtures and combinations thereof.

The reinforcement of the concrete in accordance with the present invention is not a critical aspect of the present invention, and, thus, any type of reinforcement required by design requirements can be used. Such types of concrete reinforcement include, but are not limited to, deformed steel bars, cables, post tensioned cables, pre-stressed cables, fibers, steel fibers, mineral fibers, synthetic fibers, carbon fibers, steel wire fibers, mesh, lath, and the like.

The preferred cementitious material for use with the present invention comprises portland cement. The cementitious material preferably comprises a reduced amount of portland cement and an increased amount of supplementary cementitious materials; i.e., hyaloclastite, sideromelane, tachylite or mixtures thereof in accordance with the present invention. This results in cementitious material and concrete that is more environmentally friendly. The portland cement can also be replaced, in whole or in part, by one or more pozzolanic materials. Portland cement is a hydraulic cement. Hydraulic cements harden because of a hydration process; i.e., a chemical reaction between the anhydrous cement powder and water. Thus, hydraulic cements can harden underwater or when constantly exposed to wet weather. The chemical reaction results in hydrates that are substantially water-insoluble and so are quite durable in water. Other hydraulic cements useful in the present invention include, but are not limited to, calcium aluminate cement, belite cement (dicalcium silicate), phosphate cements and anhydrous gypsum. However, the preferred hydraulic cement is portland cement.

In a disclosed embodiment of the present invention, concrete or mortar comprises a hydraulic cement, hyaloclastite, sideromelane, tachylite or mixtures thereof in accordance with the present invention, aggregate and water. Preferably, the cementitious material used to form the concrete or mortar comprises portland cement and hyaloclastite, sideromelane, tachylite or mixtures thereof powder, more preferably portland cement and hyaloclastite, sideromelane, tachylite or mixtures thereof having a volume-based mean particle size of less than or equal to approximately 40 μm, most preferably portland cement and hyaloclastite, sideromelane, tachylite or mixtures thereof having a volume average particle size of less than or equal to approximately 20 μm, especially less than or equal to approximately 15 μm, more especially less than or equal to approximately 10 μm, most especially less than or equal to approximately 5 μm. The foregoing ranges include all of the intermediate values. In simple terms, the hyaloclastite, sideromelane, tachylite or mixtures thereof is reduced to a fine powder such that the fine powder has pozzolanic properties.

In another disclosed embodiment of the present invention, concrete including hyaloclastite, sideromelane, tachylite or mixtures thereof in accordance with the present invention can include any other pozzolan in combination with hydraulic cement.

The portland cement and hyaloclastite, sideromelane, tachylite or mixtures thereof in accordance with the present invention can be combined physically or mechanically in any suitable manner and is not a critical feature of the present invention. For example, the portland cement and hyaloclastite, sideromelane, tachylite or mixtures thereof in accordance with the present invention can be mixed together to form a uniform blend of dry cementitious material prior to combining with the aggregate and water. Or, the portland cement and hyaloclastite, sideromelane, tachylite or mixtures thereof in accordance with the present invention can be added separately to a conventional concrete mixer, such as a transit mixer of a ready-mix concrete truck, at a batch plant. The water and aggregate can be added to the mixer before the cementitious material; however, it is preferable to add the cementitious material first, the water second, the aggregate third and any makeup water last.

Chemical admixtures can also be used with the concrete in accordance with the present invention. Such chemical admixtures include, but are not limited to, accelerators, retarders, air entrainments, plasticizers, superplasticizers, coloring pigments, corrosion inhibitors, bonding agents and pumping aid.

Mineral admixtures can also be used with the concrete in accordance with the present invention. Although mineral admixtures can be used with the concrete of the present invention, it is believed that mineral admixtures are not necessary. However, in some embodiments it may be desirable to include a water reducing admixture, such as a superplasticizer.

Concrete can also be made from a combination of portland cement and pozzolanic material or from pozzolanic material alone. There are a number of pozzolans that historically have been used in concrete. A pozzolan is a siliceous or siliceous and aluminous material which, in itself, possesses little or no cementitious value but which will, in finely divided form and in the presence of water, react chemically with calcium hydroxide at ordinary temperatures to form compounds possessing cementitious properties (ASTM C618). The broad definition of a pozzolan imparts no bearing on the origin of the material, only on its capability of reacting with calcium hydroxide and water. The general definition of a pozzolan embraces a large number of materials, which vary widely in terms of origin, composition and properties The most commonly used pozzolans today are industrial by-products, such as slag cement (ground granulated blast furnace slag), fly ash, silica fume from silicon smelting, and natural pozzolans such as highly reactive metakaolin, and burned organic matter residues rich in silica, such as rice husk ash.

Hyaloclastite, sideromelane and tachylite in accordance with the present invention are previously unknown natural pozzolans. They can be used as a substitute for any other pozzolan or in combination with any one or more pozzolans that are used in combination with any hydraulic cement used to make concrete or mortar.

It is specifically contemplated as a part of the present invention that concrete formulations including hyaloclastite, sideromelane, tachylite or mixtures thereof in accordance with the present invention can be used with concrete forms or systems that retain the heat of hydration to accelerate the curing of the concrete. Therefore, in another disclosed embodiment of the present invention, concrete in accordance with the present invention can be cured using concrete forms such as disclosed in U.S. Pat. Nos. 8,555,583; 8,756,890; 8,555,584; 8,532,815; 8,877,329; 9,458,637; 8,844,227 and 9,074,379 (the disclosures of which are all incorporated herein by reference); published patent application Publication Nos. 2014/0333010; 2014/0333004 and 2015/0069647 (the disclosures of which are all incorporated herein by reference) and U.S. patent application Ser. No. 15/418,937 filed Jan. 30, 2017 (the disclosure of which is incorporated herein by reference).

The following examples are illustrative of selected embodiments of the present invention and are not intended to limit the scope of the invention.

Example 1

The hyaloclastite, sideromelane and tachylite in accordance with the present invention all have the unexpected property of reduced water demand of the cementitious matrix. For example, the water demand of other pozzolans is higher. As an example, metakaolin's water demand is greater than portland cement when tested in accordance to ASTM C-618; i.e., water requirement as a percent of control is greater than 100. As shown in Table 1 below, pumice (a natural pozzolan) and comparable particle size to hyaloclastite in accordance with the resent invention had a water demand greater than portland cement. However, hyaloclastite in accordance with the present invention and having a mean particle size of 14 μm when tested in accordance with the ASTM C 311 and ASTM C-618 had a water requirement of 97% when compared with the portland cement control sample. The hyaloclastite in accordance with the present invention of mean particle size of 8 μm when tested in accordance with the ASTM C-618 had a water requirement of 96% when compared with the portland cement control sample. The hyaloclastite in accordance with the present invention having a mean particle size of 4 μm when tested in accordance with the ASTM C-618 had a water requirement of 97% when compared with the portland cement control sample. When tested in accordance to ASTM-618 the hyaloclastite had significantly lower water demand than pumice or portland cement. The water demand of each type is show in Table 1 below.

TABLE 1

| ASTM C-618 Water requirement test results compared to control sample | | | | |
|---|---|---|---|---|
| Product type | SiO$_2$ (%) | Al$_2$O$_3$ (%) | Fe$_2$O$_3$ (%) | Total (SiO$_2$ + Al$_2$O$_3$ + Fe$_2$O$_3$) | Water Requirement (Test H$_2$O/Control H$_2$O) |
| Pumice (14 μm, d50) | 64.30 | 15.17 | 7.89 | 87.36 | 103% |
| Hyaloclastite (14 μm, d50) | 46.99 | 12.15 | 12.13 | 71.28 | 97% |
| Pumice (8 μm, d50) | 63.57 | 15.23 | 7.82 | 86.62 | 103% |
| Hyaloclastite (8 μm, d50) | 47.20 | 12.49 | 12.04 | 71.73 | 95% |
| Hyaloclastite (4 μm, d50) | 47.20 | 12.49 | 12.04 | 71.73 | 97% |

Example 2

Hyaloclastite, sideromelane and tachylite in accordance with the present invention all have the unexpected property of significantly reducing ASR in concrete. Test specimens were prepared in accordance with the procedures described in ASTM C441 as modified by ASTM C311. Three control mortar bars were each prepared from a control mix and three test mortar bars were each prepared from a test mix using the modified proportions specified by ASTM C311. The mix proportions are listed in Table 2 below.

TABLE 2

| Mix Proportions | | |
|---|---|---|
| | Control Mix | Test Mix |
| Cemex Cement, g | 400 | 0 |
| Lehigh Cement, g | 0 | 300 |
| Hyaloclastite (8 μm, d50), g | 0 | 100 |
| Graded Pyrex Glass, g | 900 | 900 |
| Water, ml | 226 | 213 |
| Flow (100-115%) | 115 | 102 |

As required by ASTM C311, the cement for the control mixture had an alkali content less than 0.60% (as equivalent $Na_2O$) and the cement used in the test mixture had an alkali content greater than that of the cement used in the control mixture. Cemex cement with an equivalent $Na_2O$ of 0.30% was used for the control mixtures and Lehigh cement with an equivalent $Na_2O$ of 0.61% was used for the test mixture. A sufficient amount of water was used to produce a flow of 100% to 115%. The specimens were cured in a moist room for 24 hours and then stored in a moist container as specified in ASTM C227-Standard Test Method for Potential Alkali Reactivity of Cement-Aggregate Combinations (Mortar-Bar Method) at 38° C.±2° C. for 14 days. Results of the testing are reported in Table 3 below.

TABLE 3

ASR Test Results

| | Length (inches) | | Length Change |
|---|---|---|---|
| | Initial | 14 Days | (%) |
| Control 1 | 0.0463 | 0.0487 | 0.022 |
| Control 2 | 0.0528 | 0.0546 | 0.016 |
| Control 3 | 0.0542 | 0.0439 | 0.018 |
| Average | | | 0.019 |
| Longview 1 | 0.0464 | 0.0463 | −0.003 |
| Longview 2 | 0.0456 | 0.0452 | −0.006 |
| Longview 3 | 0.0443 | 0.0439 | −0.006 |
| Reference | 0.0436 | 0.0438 | — |
| Average | | | −0.005 |
| Reduction of Mortar Expansion as % of Control | | | 126.3% |

When tested in accordance to the ASTM C441-11, the test bars showed a reduction of Mortar Bar Expansion of 126.3% when compared to the control bar. Typical Fly Ash Mortar Bar Expansion reduction when tested in accordance with ASTM C441-11 is approximately 60%-75%. Thus, hyaloclastite in accordance with the present invention reduces ASR much better than fly ash.

Example 3

Hyaloclastite, sideromelane and tachylite in accordance with the present invention all have the unexpected property of improved strength development. Test specimens were prepared in accordance with the procedures described in ASTM C311 and tested in accordance with ASTM C618. Control mortar samples were each prepared from a control mix and mortar samples of pumice of 14 μm and 8 μm average mean particle size and hyaloclastite of 14 μm, 8 μm and 4 μm average mean particle size in accordance with the present invention. These mortar cubes samples were each prepared from a test mix using the modified proportions specified by ASTM C311 and tested in accordance with ASTM C618. Sufficient samples we made and testing was conducted at 1, 3, 7, 14, 28 and 56 days. In order to pass ASTM C618, a natural pozzolan must have a minimum of 75% strength gain at 7 and 28 days when compared to the portland cement sample. As shown below, hyaloclastite in accordance with the present invention performed better than pumice at each of these intervals. Surprisingly, while pumice at 8 μm mean particle size developed lower compressive strength than pumice at 14 μm mean particle size; whereas, hyaloclastite at 8 μm mean particle size developed higher compressive strength than hyaloclastite at 14 μm mean particle size. Over time hyaloclastite in accordance with the present invention had similar or better compressive strength test results than the portland cement control samples. Results are of these tests are shown in Tables 4 and below.

TABLE 4

ASTM C-618 Mortar Cube Testing results
Compression PSI

| Test | Control #1 | Control #2 | Control #3 | Pumice (14 μm, d50) | Pumice (8 μm, d50) | Hyaloclastite (14 μm, d50) | Hyaloclastite (8 μm, d50) | Hyaloclastite (4 μm, d50) |
|---|---|---|---|---|---|---|---|---|
| 1 Day | 2850 | 2980 | | 2170 | | 2450 | 2510 | 2620 |
| 3 Day | 4840 | 4610 | | 3300 | | 3620 | 3710 | 4160 |
| 7 Day | 4680 | | 5150 | 3750 | 3360 | 3960 | 4240 | 5060 |
| 14 Day | 5520 | 5630 | | 4430 | | 4130 | 4770 | 5760 |
| 28 Day | 5640 | | 6350 | 5180 | 4610 | 5280 | 5530 | 7030 |
| 56 Day | 6410 | 6060 | | 5540 | | 5570 | 5700 | 6670 |

TABLE 5

Percentage strength gain (test sample/control sample)
SAI %

| Test | Pumice (14 μm, d50) | Pumice (8 μm, d50) | Hyaloclastite (14 μm, d50) | Hyaloclastite (8 μm, d50) | Hyaloclastite (4 μm, d50) |
|---|---|---|---|---|---|
| 1 Day | 76 | | 82 | 84 | 88 |
| 3 Day | 68 | | 79 | 80 | 90 |
| 7 Day | 80 | 72 | 85 | 91 | 98 |
| 14 Day | 80 | | 73 | 85 | 102 |
| 28 Day | 92 | 82 | 94 | 98 | 111 |
| 56 Day | 86 | | 92 | 94 | 110 |

The foregoing tests demonstrate that hyaloclastite in accordance with the present invention unexpectedly produces greater compressive strength gain than pumice (a natural pozzolan) and the portland cement control samples.

Example 4

The specific gravity of portland cement is 3.1. The specific gravity of pozzolans varies from 2.05 to 2.65. Table 6 below shows the specific gravity for portland cement, hyaloclastite, pumice, dacite, rhyolite, fly ash, matakaolin and nano silica.

TABLE 6

| Specific Gravity comparison | |
| --- | --- |
| Product type | Specific Gravity |
| Portland Cement | 3.10 |
| Hyaloclastite | 2.8-3.0 |
| Pumice | 2.3-2.6 |
| Dacite | 2.6-2.7 |
| Rhyolite | 2.7-2.8 |
| Fly Ash | 2.03-2.6 |
| Metakaolin | 2.5-2.6 |
| Nanosilioca | 2.20 |

When pozzolans are used to replace portland cement, the ratio of replacement takes into consideration specific gravity. Since all pozzolans have a lower specific gravity than portland cement, the pozzolan's replacement weight must be adjusted according to the difference in the density. Accordingly, known pozzolan replacement ratios are often greater than 1 and sometimes as high as 1.3. Hyaloclastite in accordance with the present invention has a specific gravity of 2.90-3.0. Therefore, the replacement ratio of hyaloclastite in accordance with the present invention for portland cement can be one-to-one, thereby saving material and costs.

Example 5

The particle size of hyaloclastite in accordance with the present invention was analyzed using a MICROTRAC-X100 light scattering particles size measuring equipment. The particles were measure in isopropyl alcohol, had a reflective index of 1.38, a load factor of 0.0824 and a transmission of 0.87. Table 7 below shows a summary of the particles size analysis for a hyaloclastite sample wherein 85% by volume of the particles passed through a 325-mesh screen.

TABLE 7

| Property | Value |
| --- | --- |
| mv | 15.10 |
| mn | 1.180 |
| ma | 4.651 |
| cs | 1.290 |
| sd | 12.62 |

In Table 7 above, the abbreviation "mv" means "mean diameter in microns of the "volume distribution" represents the center of gravity of the distribution. Mie or modified Mie calculations are used to calculate the distribution. Implementation of the equation used to calculate MV will show it to be weighted (strongly influenced) by a change in the volume amount of large particles in the distribution. It is one type of average particle size or central tendency".

The abbreviation "mn" means "mean diameter, in microns, of the "number distribution" is calculated using the volume distribution data and is weighted to the smaller particles in the distribution. This type of average is related to population or counting of particles".

The abbreviation "ma" means "mean diameter, in microns, of the "area distribution" is calculated from the volume distribution. This area mean is a type average that is less weighted (also less sensitive) than the MV to changes in the amount of coarse particles in the distribution. It represents information on the distribution of surface area of the particles of the distribution".

The abbreviation "cs" means "calculated surface—Provided in units of $M^2/cc$, the value provides an indication of the specific surface area. The CS computation assumes smooth, solid, spherical particles. It may be converted to classical units for SSA of $M^2/g$ by dividing the value by the density of the particles. It should not be interchanged with BET or other adsorption methods of surface area measurement since CS does not take into effect porosity of particles, adsorption specificity or topographical characteristics of particles".

The abbreviation "cs" means "Standard Deviation in microns, also known as the Graphic Standard Deviation ($\sigma g$), is one measure of the width of the distribution. It is not an indication of variability for multiple measurements. Equation to calculate is: (84%-16%)/2".

In Table 8 below, the particle size distribution is shown in terms of percentile.

TABLE 8

| Percentile | Value |
| --- | --- |
| 10% | 1.735 |
| 20% | 3.047 |
| 30% | 4.638 |
| 40% | 6.707 |
| 50% | 9.393 |
| 60% | 13.11 |
| 70% | 17.92 |
| 80% | 24.27 |
| 90% | 35.31 |
| 95% | 47.68 |

In Table 9 below, the particle size distribution is shown in terms of particle size.

TABLE 9

| Size (microns) | % Pass | Size (microns) | % Pass |
| --- | --- | --- | --- |
| 704.0-104.7 | 100.00 | 7.133 | 41.80 |
| 95.96 | 99.74 | 6.541 | 36.83 |
| 88.00 | 99.36 | 5.998 | 36.83 |
| 80.70 | 98.99 | 5.500 | 34.45 |
| 74.00 | 98.58 | 5.044 | 32.15 |
| 67.86 | 98.10 | 4.625 | 29.93 |
| 62.23 | 97.54 | 4.241 | 27.76 |
| 52.33 | 96.06 | 3.889 | 25.65 |
| 57.06 | 96.87 | 3.566 | 23.58 |
| 47.98 | 95.08 | 3.270 | 21.58 |
| 44.00 | 93.92 | 2.999 | 19.66 |
| 40.35 | 92.55 | 2.750 | 17.83 |
| 37.00 | 90.96 | 2.522 | 16.12 |
| 33.93 | 89.13 | 2.312 | 14.54 |
| 31.11 | 87.07 | 2.121 | 13.08 |
| 28.53 | 84.79 | 1.945 | 11.71 |
| 26.16 | 82.31 | 1.783 | 10.41 |
| 23.99 | 79.65 | 1.635 | 9.15 |
| 22.00 | 76.85 | 1.499 | 7.91 |
| 20.17 | 73.97 | 1.375 | 6.69 |
| 18.50 | 71.07 | 1.261 | 5.49 |
| 16.96 | 68.18 | 1.156 | 4.36 |
| 15.56 | 65.35 | 1.060 | 3.33 |
| 14.27 | 62.60 | 0.972 | 2.44 |
| 13.08 | 59.92 | 0.892 | 1.72 |
| 12.00 | 57.30 | 0.818 | 1.15 |
| 11.00 | 54.71 | 0.750 | 0.73 |

TABLE 9-continued

| Size (microns) | % Pass | Size (microns) | % Pass |
|---|---|---|---|
| 10.09 | 52.13 | 0.688 | 0.41 |
| 9.250 | 49.55 | 0.630 | 0.16 |
| 8.482 | 46.96 | 0.578-0.133 | 0.00 |
| 7.778 | 44.37 | | |

Example 6

The particle size of hyaloclastite in accordance with the present invention was analyzed using a MICROTRAC-X100 light scattering particles size measuring equipment. The particles were measure in isopropyl alcohol, had a reflective index of 1.38, a load factor of 0.0884 and a transmission of 0.86. Table below shows a summary of the particles size analysis for a hyaloclastite sample wherein 95% by volume of the particles passed through a 325-mesh screen.

TABLE 10

| Property | Value |
|---|---|
| mv | 8.736 |
| mn | 1.488 |
| ma | 4.386 |
| cs | 1.368 |
| sd | 6.136 |

In Table 11 below, the particle size distribution is shown in terms of percentile.

TABLE 11

| Percentile | Value |
|---|---|
| 10% | 1.953 |
| 20% | 2.962 |
| 30% | 3.987 |
| 40% | 5.270 |
| 50% | 6.830 |
| 60% | 8.682 |
| 70% | 10.74 |
| 80% | 13.44 |
| 90% | 17.74 |
| 95% | 22.21 |

Table 12 below, the particle size distribution is shown in terms of particle size.

TABLE 12

| Size (microns) | % Pass |
|---|---|
| 704.0-52.33 | 100.00 |
| 47.98 | 99.87 |
| 44.00 | 99.68 |
| 40.35 | 99.46 |
| 37.00 | 99.20 |
| 33.93 | 98.86 |
| 31.11 | 98.43 |
| 28.53 | 97.87 |
| 26.16 | 97.12 |
| 23.99 | 96.13 |
| 22.00 | 94.85 |
| 20.17 | 93.21 |
| 18.50 | 91.16 |
| 16.96 | 88.66 |
| 15.56 | 85.75 |
| 14.27 | 82.46 |
| 13.08 | 78.86 |

TABLE 12-continued

| Size (microns) | % Pass |
|---|---|
| 12.00 | 75.05 |
| 11.00 | 71.11 |
| 10.09 | 67.12 |
| 9.250 | 63.15 |
| 8.482 | 59.25 |
| 7.778 | 55.45 |
| 7.133 | 51.78 |
| 6.541 | 48.25 |
| 5.998 | 44.86 |
| 5.500 | 41.58 |
| 5.044 | 38.39 |
| 4.625 | 35.27 |
| 4.241 | 32.18 |
| 3.889 | 29.13 |
| 3.566 | 26.11 |
| 3.270 | 23.18 |
| 2.999 | 20.39 |
| 2.750 | 17.80 |
| 2.522 | 15.46 |
| 2.312 | 13.38 |
| 2.121 | 11.55 |
| 1.945 | 9.93 |
| 1.783 | 8.48 |
| 1.635 | 7.15 |
| 1.499 | 5.91 |
| 1.375 | 4.76 |
| 1.261 | 3.69 |
| 1.156 | 2.73 |
| 1.060 | 1.92 |
| 0.972 | 1.26 |
| 0.892 | 0.77 |
| 0.818 | 0.41 |
| 0.750 | 0.15 |
| 0.688-0.133 | 0.00 |

In another disclosed embodiment of the present invention, hyaloclastite, sideromelane, or tachylite or mixtures thereof, in accordance with the present invention, can be used to form a geopolymer-based cementitious binder; specifically, geopolymer cement or geopolymer cement concrete. To form a geopolymer cement, hyaloclastite, sideromelane, tachylite or combinations or mixtures thereof in accordance with the present invention; i.e., having the desired particle sizes as specified above, is combined with an aqueous alkaline activating solution.

In geopolymer formation an aluminosilicate material is mixed with an aqueous alkaline activating solution that initially dissolves aluminum and silicon ion from the hyaloclastite, sideromelane or tachylite thereby releasing silica and alumina monomers. The degree to which the aluminosilicate material dissolves is related to the reactivity of the material, the strength of the activating solution and time. Alkaline activating solutions are typically an alkaline soda, such as sodium hydroxide or potassium hydroxide, and optionally an aqueous soluble silica, such as sodium silicate or potassium silicate. The concentration of effective alkaline activating solutions typically ranges from approximately 1.7 to 3.3 lbs (5 to N) hydroxide per gallon of solution. The alumina and silica monomers then begin to reorganize and condense into larger groups. As the groups form, water molecules are released. The dissolution phase and the alkalinity of the activating solution greatly affect the rate of reaction.

In a disclosed embodiment of the present invention, it is desirable to balance the amount of Si, Al and water in a geopolymer cement concrete mix design. Then using a hyaloclastite, sideromelane, tachylite pozzolan in accordance with the present invention, the amount of Si and Al may vary depending on the source of the hyaloclastite, sideromelane, tachylite. For example, as stated above hyaloclastite from a basaltic source will have less than 53% by weight $SiO_2$; whereas, hyaloclastite from a rhyolitic source has greater than 69% by weight $SiO_2$. It is also desirable to balance the amount of water and activating agent. Table 13 below shows desirable ratios of the foregoing agents for a preferred geopolymer cement concrete.

TABLE 13

| | Compositional Ranges | |
|---|---|---|
| | Ratio Ranges (by weight) | |
| Materials | Low | High |
| $M_2O/SiO_2$ | 0.2 | 0.48 |
| $SiO_2/Al_2O_3$ | 3.3 | 4.5 |
| $H_2O/M_2O$ | 10.0 | 25.0 |
| $M_2O/Al_2O_3$ | 0.8 | 1.6 |

In Table 13 above, M represents Na or K. In general, K provides more strength, but is usually more expensive than Na. Additions of CaO or $CaCO_3$ tend to improve strength. If setting times are too fast, then borate can be added as a retarder which may result in strength increase.

Alkaline activating solutions useful in the present invention comprise aqueous solutions of compounds having reactive hydroxyl groups, such as hydroxides, and optionally water-soluble alkali metal silicates or mixtures thereof. Alkaline activating agents include, but are not limited to, NaOH (lye), KOH, $Ca(OH)_2$ (hydrated lime), or other minerals or compounds having reactive hydroxyl groups. Particularly preferred hydroxides are NaOH and KOH. Of course, the hydroxide can be generated in situ be adding in dry form $Na_2O$, $K_2O$ or CaO (quick lime), which upon hydration yields NaOH, KOH and $Ca(OH)_2$, respectively. It is sometimes desirable to provide the natural pozzolan of the present invention and the alkaline activating agent as a premix in dry form. The dry premix can then be combined with water to form the geopolymer cement.

The optional water-soluble alkali metal silicates include, but are not limited to, sodium silicates, potassium silicates and aluminosilicates. Sodium silicate is a generic name for chemical compounds with the formula $Na_{2x}Si_yO_{2y+x}$ or $(Na_2O)_x\cdot(SiO_2)_y$, such as sodium metasilicate $Na_2SiO_3$, sodium orthosilicate $Na_4SiO_4$ and sodium pyrosilicate $Na_6Si_2O_7$. The anions are often polymeric. These compounds are generally colorless, transparent solids or white powders and are soluble in water in various amounts. Because geopolymer cement curing does not rely on hydration reactions, it is particularly attractive for its rapid strength development and reduced tendency for shrinkage and creep compared with portland cement.

Additionally, a relatively small amount of hydraulic cement or pozzolan can be used as a component of the alkaline activating solution. Amounts of hydraulic cement or pozzolan can be used alone or in combination with the alkaline activating agents listed above. Amounts of hydraulic cement or pozzolan can be used up to and including 30% by weight of the geopolymer; i.e., 0% to 30% by weight (the foregoing range includes all of the intermediate values). A preferred hydraulic cement for use in the present invention is kiln dust, a waste product of the portland cement manufacture may be used to create an alkaline environment. Pozzolans that can be used in the present invention include, but are not limited to, industrial by-products, such as slag cement (ground granulated blast furnace slag), fly ash, silica fume from silicon smelting, and natural pozzolans such as highly reactive metakaolin, and burned organic matter residues rich in silica, such as rice husk ash.

Geopolymer cement is an alternative to portland cement. Advantages of geopolymer cement include, but are not limited to, resistance to freeze and thaw cycling, high chemical resistance, faster or slower set times which are formulation controllable, low air and water permeability and heat resistance. Significantly, geopolymer cement provides environmental benefits due to its reduced carbon footprint.

Mixing and curing temperatures are factors that affect the physical characteristics of geopolymer cement and concrete. Curing at higher temperatures generally accelerates curing and strength gain. Accordingly, self-annealing concrete forms can be used to accelerate the curing of geopolymer cements and concretes in accordance with the present invention. Self-annealing concrete forms that can be used with the geopolymer cements and concrete of the present invention include, but are not limited to, the forms disclosed in U.S. Pat. Nos. 8,555,583; 8,756,890; 8,555,584; 8,532,815; 8,844,227; 8,877,329; 9,074,379; 9,458,637; 9,776,920; 9,862,118; 10,065,339; 10,220,542; and 10,280,622 (the disclosures of which are all incorporated herein by reference in their entirety).

In a disclosed embodiment of the present invention, hyaloclastite having a particle size of less than or equal to 40 microns, preferably less than or equal to microns, more preferably less than or equal to microns, especially less than or equal to microns (all volume-based mean particle size), is combined with an alkaline activating solution. The alkaline activating solution is sodium hydroxide and optionally sodium silicate dissolved in water. Alternatively, the alkaline activating solution is potassium hydroxide and optionally potassium silicate dissolved in water. To make a geopolymer cement in accordance with the present invention, the hyaloclastite powder and the alkaline activating solution are combined. To make a geopolymer cement concrete in accordance with the present invention, the hyaloclastite powder and aggregate (fine aggregate, coarse aggregate or both) are combined with the alkaline activating solution.

The following examples are illustrative of selected embodiments of the present invention and are not intended to limit the scope of the invention.

Example 7

Geopolymer cement concrete is formed by combining the constituents shown in Table 14 below.

TABLE 14

| Material | Weight (lbs/yd³) |
|---|---|
| Sodium silicate | 277 |
| Sodium hydroxide | 36 |
| Hyaloclastite (8 micron) | 787 |
| Fine aggregate | 1370 |
| Coarse aggregate | 1370 |
| Water | 75 |
| Total | 3915 |

The geopolymer cement concrete is cured at a temperature of 140 to 170° F. (60 to 77° C.). The resulting cured geopolymer cement concrete has physical properties comparable to or better than portland cement concrete.

Example 8

Geopolymer cement concrete is formed by combining the constituents shown in Table 15 below.

TABLE 15

| Material | Weight (lbs/yd$^3$) |
|---|---|
| potassium silicate | 277 |
| potassium hydroxide | 36 |
| Sideromelane (4 micron) | 787 |
| Water | 75 |
| Fine aggregate | 1370 |
| Coarse aggregate | 1370 |
| Total | 3915 |

The geopolymer cement concrete is cured at a temperature of 140 to 170° F. (60 to 77° C.). The resulting cured geopolymer cement has physical properties comparable to or better than portland cement concrete.

Example 9

Geopolymer cement concrete is formed by combining the constituents shown in Table 16 below.

TABLE 16

| Material | Weight (lbs/yd$^3$) |
|---|---|
| potassium silicate | 277 |
| sodium hydroxide | 36 |
| Tachylite (8 micron) | 787 |
| Water | 75 |
| Fine aggregate | 1370 |
| Coarse aggregate | 1370 |
| Total | 3915 |

The geopolymer cement concrete is cured at a temperature of 140 to 170° F. (60 to 77° C.). The resulting cured geopolymer cement has physical properties comparable to or better than portland cement concrete.

Example 10

Geopolymer cement concrete is formed by combining the constituents shown in Table 17 below.

TABLE 17

| Material | Weight (lbs/yd$^3$) |
|---|---|
| sodium silicate | 277 |
| potassium hydroxide | 36 |
| Hyaloclastite (4 micron) | 787 |
| Water | 75 |
| Fine aggregate | 1370 |
| Coarse aggregate | 1370 |
| Total | 3915 |

The geopolymer cement is cured at ambient or elevated temperatures. The resulting cured geopolymer cement has physical properties comparable to or better than portland cement concrete.

Example 11

Geopolymer cement concrete is formed by combining the constituents shown in Table 18 below. A water reducing admixture can be added to the mix such as ADVA190 from Grace, Columbia, Maryland.

TABLE 18

| | Mixture Proportions | | Batch Proportions | | |
|---|---|---|---|---|---|
| Material | Solid Volume one m$^3$ | SSD Batch Mass (kg) | SSD Batch Wt. (lb) | Corr. (lb) | Actual Batch Wt. (lb) |
| Hyaloclastite ACM | 0.1851 | 409 | 89.4 | 0.000 | 89.4 |
| Sand | 0.2242 | 590 | 128.8 | −1.5 | 130.3 |
| Pea Gravel | 0.4552 | 1256 | 274.5 | 5.0 | 269.5 |
| Na$_2$SiO$_3$ | 0.0670 | 103 | 22.4 | | 22.40 |
| NaOH | 0.0260 | 41 | 8.9 | | 8.86 |
| | L | kg | fl. oz | lb | ml |
| Adva 190 | 5.5 | 6.0 | 18.5 | 1.30 | 547 |
| Water | 0.0225 | 22.5 | 4.9 | 3.5 | 8.44 |
| Air | 0.02 | | admix adjusted | | 8.44 |
| Yield | 1 | 1 | Final Water | | 8.44 |

Example 12

Geopolymer cement concrete is formed by combining the constituents shown in Table 19 below.

TABLE 19

| Material | Weight (lbs/yd$^3$) |
|---|---|
| sodium silicate | 277 |
| potassium hydroxide | 18 |
| Kiln dust | 18 |
| Hyaloclastite (4 micron) | 787 |
| Water | 75 |
| Fine aggregate | 1370 |
| Coarse aggregate | 1370 |
| Total | 3915 |

The geopolymer cement is cured at ambient or elevated temperatures. The resulting cured geopolymer cement has physical properties comparable to or better than portland cement concrete.

Example 13

Geopolymer cement concrete is formed by combining the constituents shown in Table 20 below.

TABLE 20

| Material | Weight (lbs/yd$^3$) |
|---|---|
| sodium silicate | 277 |
| potassium hydroxide | 18 |
| Portland cement | 18 |
| Hyaloclastite (4 micron) | 787 |
| Water | 75 |
| Fine aggregate | 1370 |
| Coarse aggregate | 1370 |
| Total | 3915 |

The geopolymer cement is cured at ambient temperature or elevated temperatures. The resulting cured geopolymer cement has physical properties comparable to or better than portland cement concrete.

Example 14

Geopolymer cement concrete is formed by combining the constituents shown in Table 21 below.

TABLE 21

| Material | Weight (lbs/yd$^3$) |
| --- | --- |
| sodium silicate | 277 |
| potassium hydroxide | 18 |
| Portland cement | 18 |
| tachylite (4 micron) | 787 |
| Water | 75 |
| Fine aggregate | 1370 |
| Coarse aggregate | 1370 |
| Total | 3915 |

The geopolymer cement is cured at ambient temperature or elevated temperatures. The resulting cured geopolymer cement has physical properties comparable to or better than portland cement concrete.

Example 15

Geopolymer cement concrete is formed by combining the constituents shown in Table 22 below.

TABLE 22

| Material | Weight (lbs/yd$^3$) |
| --- | --- |
| sodium silicate | 277 |
| potassium hydroxide | 18 |
| Portland cement | 18 |
| sideromelane (4 micron) | 787 |
| Water | 75 |
| Fine aggregate | 1370 |
| Coarse aggregate | 1370 |
| Total | 3915 |

The geopolymer cement is cured at ambient temperature or elevated temperatures. The resulting cured geopolymer cement has physical properties comparable to or better than portland cement concrete.

Example 16

Geopolymer cement concrete is formed by combining the constituents shown in Tables 23 and 24 below.

TABLE 23

| Material | kg/cu m | Sp. G | Volume |
| --- | --- | --- | --- |
| Hyaloclastite Pozzolan | 390 | 2.83 | 137.81 |
| Silica Sand | 550 | 2.26 | 243.36 |
| Coarse Agg Granite | 1320 | 2.8 | 471.43 |
| NaOH (40%) | 40 | 1.5 | 26.67 |
| Na2SiO3 | 100 | 1.53 | 65.36 |
| Water | 40 | 1 | 40 |
| Super (polycarboxylate) | 5.9 | 1.08 | 5.46 |
| Air(1%) | | | 10 |
| | | | 1000 |

The mix shown in Table 23 above translates into a mix by weight as shown in Table 24 below.

TABLE 24

| Material | lb/cu yd |
| --- | --- |
| Hyaloclastite Pozzolan | 659 |
| Silica Sand | 930 |
| Coarse Agg Granite | 2231 |

TABLE 24-continued

| Material | lb/cu yd |
| --- | --- |
| NaOH (40%) | 68 |
| Na$_2$SiO$_3$ | 169 |
| Water | 68 |
| Super | 10 |

The geopolymer cement is cured at ambient or elevated temperatures. The resulting cured geopolymer cement has physical properties comparable to or better than portland cement concrete.

Of course, conventional concrete admixtures, such as water reducers, can be added to the geopolymer cement concrete formulations in accordance with the present invention.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A cementitious material comprising:
   a natural pozzolan selected from hyaloclastite, sideromelane, tachylite or combinations or mixtures thereof, wherein the natural pozzolan has a volume-based mean particle size of less than or equal to approximately 40 μm; and
   quicklime; and
   water.

2. The cementitious material of claim 1, wherein the natural pozzolan has a volume-based mean particle size of less than or equal to approximately 20 μm.

3. The cementitious material of claim 1, wherein the natural pozzolan has a volume-based mean particle size of less than or equal to approximately 10 μm.

4. The cementitious material of claim 1, wherein the natural pozzolan has a volume-based mean particle size of less than or equal to approximately 5 μm.

5. The cementitious material of claim 1 further comprising aggregate.

6. The cementitious material of claim 2 further comprising aggregate.

7. The cementitious material of claim 3 further comprising aggregate.

8. The cementitious material of claim 4 further comprising aggregate.

9. A cementitious material comprising:
   a molten mineral that has been quenched by water to form a fragmented, solid mineral, wherein the mineral comprises approximately 43% to approximately 63% by weight SiO$_2$, wherein the mineral has a volume-based mean particle size of less than or equal to approximately 40 μm;
   a quicklime; and
   water.

10. The cementitious material of claim 9, wherein the natural pozzolan has a volume-based mean particle size of less than or equal to approximately 20 μm.

11. The cementitious material of claim 9, wherein the natural pozzolan has a volume-based mean particle size of less than or equal to approximately 10 μm.

12. The cementitious material of claim 9, wherein the natural pozzolan has a volume-based mean particle size of less than or equal to approximately 5 μm.

13. The cementitious material of claim 9 further comprising aggregate.

14. The cementitious material of claim 10 further comprising aggregate.

15. The cementitious material of claim 11 further comprising aggregate.

16. The cementitious material of claim 12 further comprising aggregate.

17. A cementitious material comprising:

a molten mineral that has been quenched by water to form a fragmented, solid mineral, wherein the mineral comprises approximately 43% to approximately 63% by weight $SiO_2$ and wherein the mineral has a volume-based mean particle size of less than or equal to approximately 40 μm;

hydrated lime; and water.

18. The cementitious material of claim 17, wherein the natural pozzolan has a volume-based mean particle size of less than or equal to approximately 20 μm.

19. The cementitious material of claim 17, wherein the natural pozzolan has a volume-based mean particle size of less than or equal to approximately 10 μm.

20. The cementitious material of claim 17, wherein the natural pozzolan has a volume-based mean particle size of less than or equal to approximately 5 μm.

\* \* \* \* \*